UNITED STATES PATENT OFFICE.

ISAAC P. WENDELL, OF PHILADELPHIA, PENNSYLVANIA, ASSIGNOR OF ONE-HALF TO STEPHEN P. M. TASKER, OF SAME PLACE.

COMPOUND FOR SAFE-LININGS, &c.

SPECIFICATION forming part of Letters Patent No. 377,343, dated January 31, 1888.

Application filed July 2, 1887. Serial No. 243,237. (No specimens.)

*To all whom it may concern:*

Be it known that I, ISAAC P. WENDELL, a citizen of the United States, residing at Philadelphia, in the county of Philadelphia and State of Pennsylvania, have invented certain new and useful Improvements in Compound for Safe-Linings and other Articles, of which the following is a specification.

My invention has relation to fire and water proof compounds for safe-linings, architectural moldings, tiles, and other articles; and it has for its object an inexpensive and durable material or compound, which is easily and expeditiously manufactured.

My invention accordingly consists of a compound composed of fiber or powdered asbestus, fossil meal or infusorial earth, and silicate of soda.

In making this compound the proportions of the component ingredient may be varied as desired; but I have obtained very successful results from using one part of asbestus, one part of fossil meal or infusorial earth, and one to two parts of silicate of soda. These ingredients are mixed together until the mass forms one composite whole, and then dried; or it may be subjected to pressure before being dried, or it may be applied or used in a plastic condition. The silicate of soda forms the indurating or binding material for the asbestus and fossil meal.

The asbestus is fire-proof, and the fossil meal contains enough lime to combine with the silicate of soda to form silicate of lime to absorb any water in the compound and render it water-proof against further absorption of water when in use.

Any other suitable indurating material may be substituted for the silicate of soda.

For some materials I have found pumice-stone to be a suitable equivalent for the infusorial earth, and I therefore include it within the scope of my invention.

What I claim is—

The compound herein described, composed of asbestus, fossil meal or infusorial earth, and silicate of soda.

In testimony whereof I affix my signature in presence of two witnesses.

ISAAC P. WENDELL.

Witnesses:
S. J. VAN STAVOREN,
CHAS. F. VAN HORN.